US012489237B2

(12) United States Patent
Hotsuki et al.

(10) Patent No.: US 12,489,237 B2
(45) Date of Patent: Dec. 2, 2025

(54) CONNECTOR INCLUDING SEPARATION WALL WITH GAP BETWEEN OPPOSING FACES FOR SUPRESSING EXCESSIVE IMPEDANCE DROP

(71) Applicant: IRISO ELECTRONICS CO., LTD., Yokohama (JP)

(72) Inventors: Masaki Hotsuki, Yokohama (JP); Hideki Shioda, Yokohama (JP); Daisuke Noguchi, Yokohama (JP); Yoshihito Okuma, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 378 days.

(21) Appl. No.: 18/184,819

(22) Filed: Mar. 16, 2023

(65) Prior Publication Data

US 2023/0299528 A1 Sep. 21, 2023

(30) Foreign Application Priority Data

Mar. 18, 2022 (JP) ................................ 2022-044558

(51) Int. Cl.

| | |
|---|---|
| ***H01R 12/71*** | (2011.01) |
| ***H01R 12/55*** | (2011.01) |
| ***H01R 13/11*** | (2006.01) |
| ***H01R 13/40*** | (2006.01) |
| ***H01R 13/6473*** | (2011.01) |

(52) U.S. Cl.

CPC ............. *H01R 13/40* (2013.01); *H01R 12/55* (2013.01); *H01R 12/716* (2013.01); *H01R 13/11* (2013.01); *H01R 13/6473* (2013.01)

(58) Field of Classification Search

CPC ...... H01R 13/40; H01R 12/55; H01R 12/716; H01R 13/11; H01R 13/6473; H01R 12/57; H01R 13/2457; H01R 12/91; H01R 13/02; H01R 13/502

See application file for complete search history.

(56) References Cited

U.S. PATENT DOCUMENTS

| | | | | |
|---|---|---|---|---|
| 5,051,099 A * | 9/1991 | Pickles | ................ | H01R 12/721 439/108 |
| 5,496,180 A * | 3/1996 | Fabian | ................ | H01R 12/721 439/60 |

(Continued)

FOREIGN PATENT DOCUMENTS

| | | |
|---|---|---|
| JP | 2015076215 A | 4/2015 |

OTHER PUBLICATIONS

Extended European Search Report, for European Application No. 23162510.4, dated Jun. 21, 2023, 11 pages.

*Primary Examiner* — Abdullah A Riyami
*Assistant Examiner* — Nelson R. Burgos-Guntin
(74) *Attorney, Agent, or Firm* — Westman, Champlin & Koehler, P.A.

(57) ABSTRACT

In connectors including a housing having a separation wall, an impedance of a portion of a terminal in close proximity to the separation wall is suppressed from dropping excessively.

Housings of the connector include a separation wall positioned between adjacent terminals. The separation wall includes a one-side opposing face and an other-side opposing face. Furthermore, the separation wall is formed between the one-side opposing face and the other-side opposing face, and includes a gap portion positioned between the adjacent terminals.

11 Claims, 11 Drawing Sheets

(56) References Cited

U.S. PATENT DOCUMENTS

| | | | | |
|---|---|---|---|---|
| 6,561,850 | B2 * | 5/2003 | Letourneau | H01R 12/714<br>439/60 |
| 9,065,225 | B2 * | 6/2015 | Degner | H01R 12/737 |
| 10,122,134 | B2 * | 11/2018 | Shibuya | H01R 13/28 |
| 10,404,022 | B2 * | 9/2019 | Doi | H01R 13/2457 |
| 2012/0142226 | A1 * | 6/2012 | Funayama | H01R 12/73<br>439/862 |
| 2015/0031233 | A1 * | 1/2015 | Takaki | H01R 12/716<br>439/374 |
| 2015/0132976 | A1 * | 5/2015 | Sato | H01R 13/2457<br>439/74 |
| 2017/0179626 | A1 * | 6/2017 | Hori | H01R 13/44 |
| 2020/0295511 | A1 * | 9/2020 | Shioda | H01R 12/91 |

* cited by examiner

CONNECTOR INCLUDING SEPARATION WALL WITH GAP BETWEEN OPPOSING FACES FOR SUPRESSING EXCESSIVE IMPEDANCE DROP

CROSS-REFERENCE TO RELATED APPLICATION

This application claims priority under 35 USC 119 from Japanese Patent application No. 2022-044558 filed on Mar. 18, 2022, the disclosure of which is incorporated by reference herein in its entirety.

TECHNICAL FIELD

The present disclosure relates to a connector.

BACKGROUND ART

A connector of Japanese Patent Application Laid-Open (JP-A) No. 2015-76215 includes plural terminals and a housing. Each of the plural terminals includes a contact portion for contacting a connection target. The housing includes a separation wall disposed between adjacent of the contact portions.

SUMMARY OF INVENTION

Technical Problem

In a connector such as described above, a separation wall is formed from an insulator that is the material of the housing. This means that the impedance of the contact portion disposed in close proximity to the separation wall sometimes drops excessively.

An issue addressed by the present disclosure is, in a connector including a housing with separation wall, to suppress the impedance of a portion of the terminal in close proximity to the separation wall from dropping excessively.

Solution to Problem

A connector according to a first aspect is a connector including plural terminals and a housing. The housing includes a separation wall positioned between adjacent of the terminals. The separation wall includes a one-side opposing face that opposes one of the adjacent terminals, an other-side opposing face that opposes the other of the adjacent terminals, and a gap portion formed between the one-side opposing face and the other-side opposing face.

The present aspect is a connector including the plural terminals and the housing.

The housing includes the separation wall positioned between the adjacent terminals. The separation wall includes the one-side opposing face and the other-side opposing face. The one-side opposing face is a face that opposes the one adjacent terminal, and the other-side opposing face is a face that opposes the other adjacent terminal.

Furthermore, the separation wall includes the gap portion formed between the one-side opposing face and the other-side opposing face.

This thereby raises the impedance of a close proximity portion of each of the terminals corresponding to the gap portion in comparison to embodiments not formed with such a gap portion. As a result thereof, the impedance of the terminals can be suppressed from falling excessively.

Note that in the exemplary embodiment described later an example is described in which “plural terminals” are all the terminals provided to the connector. However, the “plural terminals” of the present aspect is not limited thereto. The “plural terminals” of the present aspect may be two terminals from out of many terminals provided to the connector, or may be three terminals therefrom. In other words, the connector of the present aspect may also be provided with terminals other than the “plural terminals” of the present aspect.

Moreover, in the exemplary embodiment described later an example is described in which the “plural terminals” have the same structure as each other. However, the plural terminals” of the present aspect are not limited thereto.

Moreover, in the exemplary embodiment described later an example is described in which the gap portion is open in a direction perpendicular to a terminal array direction. However, the gap portion of the present embodiment is not limited thereto, and may, for example, not be open in any direction.

Moreover, in the exemplary embodiment described later an example is described in which the “housing” includes a fixed housing and a movable housing. However, the “housing” of the present aspect is not limited thereto and may be configured by a fixed housing alone. Namely, the connector is not necessarily a so-called floating connector.

Moreover, in the exemplary embodiment described later an example is described in which air is disposed in the gap portion. However, the gap portion of the present aspect is not limited thereto and, for example, a member having a lower permittivity than the housing may be disposed therein.

Moreover, although in the exemplary embodiment described later an example is described in which the gap portion is positioned between adjacent terminals (an example of the gap portion being positioned at a position sandwiched by adjacent terminals), the present aspect is not limited thereto. The reason for this is that even in an embodiment in which a gap portion cannot be said to be positioned between the adjacent terminals (including an embodiment in which the adjacent terminals have different shapes from each other), a gap portion still exhibits advantageous effects for adjusting impedance.

A connector according to a second aspect is the first aspect, wherein the terminals each include a restricted portion, the one-side opposing face includes a one-side restricting face that restricts one of adjacent of the restricted portions from moving in a direction approaching the other thereof, the other-side opposing face includes an other-side restricting face that restricts the other adjacent restricted portion from moving in a direction approaching the one thereof, and the restricted portion includes a contact portion configured to contact a connection target.

In the present aspect the terminals include the restricted portions. The one-side opposing face includes the one-side restricting face that restricts the one adjacent restricted portion from moving in the direction approaching the other thereof, and the other-side opposing face includes the other-side restricting face that restricts the other adjacent restricted portion from moving in the direction approaching the one thereof.

Part of the terminal (the restricted portion thereof) is accordingly suppressed from being disposed at a position displaced from a specific position. Note that reference to a restricted portion means a portion restricted from moving in the respective directions mentioned above by the one-side restricting face or the other-side restricting face of the separation wall.

Moreover, the restricted portion includes a contact portion for contacting the connection target.

This means that the contact portion is suppressed from being disposed at a position displaced from a specific position.

Note that although in the exemplary embodiment described later an example is described in which the gap portion is positioned between adjacent of the restricted portions (contact portions), the present aspect is not limited thereto. However, the restricted portion is disposed in close proximity to the separation wall and so the impedance is liable to drop excessively. Thus preferably the gap portion is positioned between the adjacent restricted portions (contact portions).

Moreover, although in the exemplary embodiment described later an example is described in which the terminals each include plural restricted portions (a first contact portion and a second contact portion), the present aspect is not limited thereto.

A connector according to a third aspect is the second aspect, wherein the contact portion includes a first contact portion and a second contact portion positioned further to a far side than the first contact portion in a connection direction of the connection target, and the gap portion is positioned between adjacent of the first contact portions and is positioned between adjacent of the second contact portions.

In the present aspect the contact portion includes the first contact portion and the second contact portion positioned further to the far side than the first contact portion in the connection direction of the connection target.

The gap portion is positioned between the adjacent first contact portions and is positioned between the adjacent second contact portions.

This accordingly enables the first contact portion and the second contact portion to be suppressed from being disposed at positions displaced from specific positions, and enables the impedances of the first contact portion and the second contact portion to be suppressed from dropping excessively.

A connector according to a fourth aspect is the third aspect, wherein a portion of the gap portion positioned between the adjacent first contact portions and a portion of the gap portion positioned between the adjacent second contact portions are coupled together in the connection direction.

In the present aspect the portion of the gap portion positioned between the adjacent first contact portions and the portion of the gap portion positioned between the adjacent second contact portions are coupled together in the connection direction.

This means that the gap portion is more easily formed than embodiments in which a portion of the gap portion positioned between the adjacent first contact portions and a portion thereof positioned between the adjacent second contact portions are not coupled together.

A connector according to a fifth aspect is any one of the second aspect to the fourth aspect, wherein each of the plural terminals includes a resilient support portion that resiliently supports the contact portion, and the separation wall is configured so as to be interposed between adjacent of the resilient support portions.

In the present aspect each of the plural terminals includes a resilient support portion that resiliently supports the contact portion.

The separation wall is configured so as to be interposed between adjacent of the resilient support portions.

Shorting between the adjacent resilient support portions caused by metal-plating gas is thereby prevented at the portion where the separation walls are interposed between the adjacent resilient support portions.

In the exemplary embodiment described later (except for the first modified example), an example is described in which the separation wall is configured so as to be interposed between the entirety of the adjacent resilient support portions, however the separation wall of the present aspect is not limited thereto. For example as in the first modified example, the separation wall of the present aspect may be configured so as to be interposed between part of adjacent resilient support portions.

The connector according to a sixth aspect is the fifth aspect, wherein the separation wall includes either a one-side separated face that is a face facing a side of one of the adjacent resilient support portions and that is formed at a position separated from the one adjacent resilient support portion further than the one-side restricting face in an adjacency direction of the adjacent resilient support portions, or an other-side separated face that is a face facing toward a side of the other adjacent resilient support portion and that is formed at a position separated from the other adjacent resilient support portion further than the other-side restricting face in the adjacency direction of the adjacent resilient support portions, or both thereof.

In the present aspect the separation wall includes either the one-side separated face, or the other-side separated face, or both thereof.

The one-side separated face is a face that faces toward the side of the one adjacent resilient support portion and that is formed at the position separated from the one adjacent resilient support portion further than the one-side restricting face in the adjacency direction (the direction in which the adjacent resilient support portion are adjacent to each other). The other-side separated face is a face that faces toward the side of the other adjacent resilient support portion, and that is formed at the position separated from the other adjacent resilient support portion further than the other-side restricting face in the adjacency direction.

This thereby enables the impedance of the resilient support portion to be suppressed from dropping excessively in comparison to embodiments in which the separation wall lacks the one-side separated face and the other-side separated face.

A connector according to a seventh aspect is the sixth aspect, wherein the one-side separated face or the other-side separated face provided to the separation wall includes a near-side separated face formed at a position displaced from a position of the one-side restricting face or the other-side restricting face in an opposite direction to a contact direction in which the contact portion contacts the connection target.

In the present aspect the one-side separated face or the other-side separated face provided to the separation wall includes the near-side separated face. The near-side separated face is the face formed at the position displaced from the position of the one-side restricting face or the other-side restricting face in the opposite direction (hereafter referred to as "opposite-to-contact direction") to the contact direction (the direction in which the contact portion contacts the connection target).

This means that when part of the resilient support portion is disposed at the position displaced from the position of the contact portion in the opposite-to-contact direction, then the impedance of this part of the resilient support portion can be suppressed from dropping excessively.

A connector according to an eighth aspect is the sixth aspect of the seventh aspect, wherein the one-side separated face or the other-side separated face provided to the separation wall includes a first far-side separated face formed at a position displaced from a position of the one-side restricting face or the other-side restricting face toward a far side in a connection direction of the connection target.

In the present aspect the one-side separated face or the other-side separated face provided to the separation wall includes the first far-side separated face. The first far-side separated face is a face formed at the position displaced from the position of the one-side restricting face or the other-side restricting face toward a far side in the connection direction of the connection target.

This means that when part of the resilient support portion is disposed at the position displaced from the position of the contact portion toward the far side in the connection direction, then the impedance of this part of the resilient support portion can be suppressed from dropping excessively.

A connector according to a ninth aspect is any one of the sixth aspect to the eighth aspect, wherein the one-side separated face or the other-side separated face provided to the separation wall includes a second far-side separated face formed at a position that is displaced from a position of the one-side restricting face or the other-side restricting face in an opposite direction to a contact direction in which the contact portion contacts the connection target and toward a far side in the connection direction of the connection target.

In the present aspect the one-side separated face or the other-side separated face includes the second far-side separated face. The second far-side separated face is a face formed at the position displaced from the position of the one-side restricting face or the other-side restricting face in the opposite-to-contact direction and toward the far side in the connection direction.

This means that in cases in which part of the resilient support portion is disposed at the position displaced from the position of the contact portion in the opposite-to-contact direction and toward the far side in the connection direction, the impedance of this part of the resilient support portion can be suppressed from dropping excessively.

A connector according to a tenth aspect is the first aspect, wherein the restricted portion includes a contact portion configured to contact a connection target, and the contact portion includes a first contact portion, and a second contact portion positioned further to a far side than the first contact portion in a connection direction of the connection target. Each of the plural terminals includes a resilient support portion that resiliently supports the contact portion. The separation wall is configured so as to be interposed between adjacent of the resilient support portions. The separation wall includes either a one-side separated face that is a face facing a side of one of the adjacent resilient support portions and that is formed at a position separated from the one adjacent resilient support portion further than the one-side restricting face in an adjacency direction of the adjacent resilient support portions, or an other-side separated face that is a face facing toward a side of the other adjacent resilient support portion and that is formed at a position separated from the other adjacent resilient support portion further than the other-side restricting face in the adjacency direction of the adjacent resilient support portions, or both thereof. The one-side separated face or the other-side separated face provided to the separation wall includes a near-side separated face formed at a position displaced from a position of the one-side restricting face or the other-side restricting face in an opposite direction to a contact direction in which the contact portion contacts the connection target, a first far-side separated face formed at a position displaced from a position of the one-side restricting face or the other-side restricting face toward a far side in a connection direction of the connection target, and a second far-side separated face formed at a position that is displaced from a position of the one-side restricting face or the other-side restricting face in an opposite direction to the contact direction in which the contact portion contacts the connection target and toward a far side in the connection direction of the connection target.

In the present aspect, in cases in which the terminals include the contact portion and the resilient support portion with the contact portion including the first contact portion and the second contact portion, shorting between the adjacent resilient support portions caused by metal-plating gas can be prevented and the impedance of the resilient support portion can be suppressed from dropping excessively.

A connector according to an eleventh aspect is the first aspect, wherein the terminals each include a first contact element and a second contact element. The first contact element includes a first contact portion and a first resilient support portion that resiliently supports the first contact portion. The second contact element includes a second contact portion positioned further to a far side than the first contact portion in a connection direction of a connection target and a second resilient support portion that resiliently supports the second contact portion.

In the present aspect the terminals include the first contact element and the second contact element. The first contact element includes the first contact portion and the first resilient support portion that resiliently supports the first contact portion. The second contact element includes the second contact portion positioned further to the far side than the first contact portion in the connection direction of the connection target and the second resilient support portion that resiliently supports the second contact portion. This thereby enables the connection reliability to be raised.

Moreover, in cases in which the terminals include the first contact element and the second contact element, although the impedance of the first contact element and the second contact element is liable to drop excessively, in the present aspect the gap portion is provided, enabling the impedance of the first contact element and the second contact element to be suppressed from dropping excessively.

Note that although in the exemplary embodiment described later an example is described in which the gap portion is positioned between the adjacent first contact portions and positioned between the adjacent second contact portions, the present aspect is not limited thereto. The present aspect encompasses configurations in which, although the gap portion is not positioned between the adjacent first contact portions and second contact portions, the gap portion is positioned between the adjacent first contact elements and positioned between the adjacent second contact elements. Furthermore, the present aspect also encompasses configurations in which the gap portion is not positioned between the adjacent first contact elements and second contact elements. This is because even when the gap portion is not positioned at such positions, the gap portion still exhibits advantageous effects for adjusting impedance of the first contact element and the second contact element.

DESCRIPTION OF EMBODIMENTS

Description follows regarding a connector 100 that is an exemplary embodiment of a connector of the present disclosure.

In each of the drawings, an arrow X will be referred to as a connector front-rear direction, an arrow Y as a connector width direction, and an arrow Z as a connector up-down direction.

Connector 100

Figure 1:
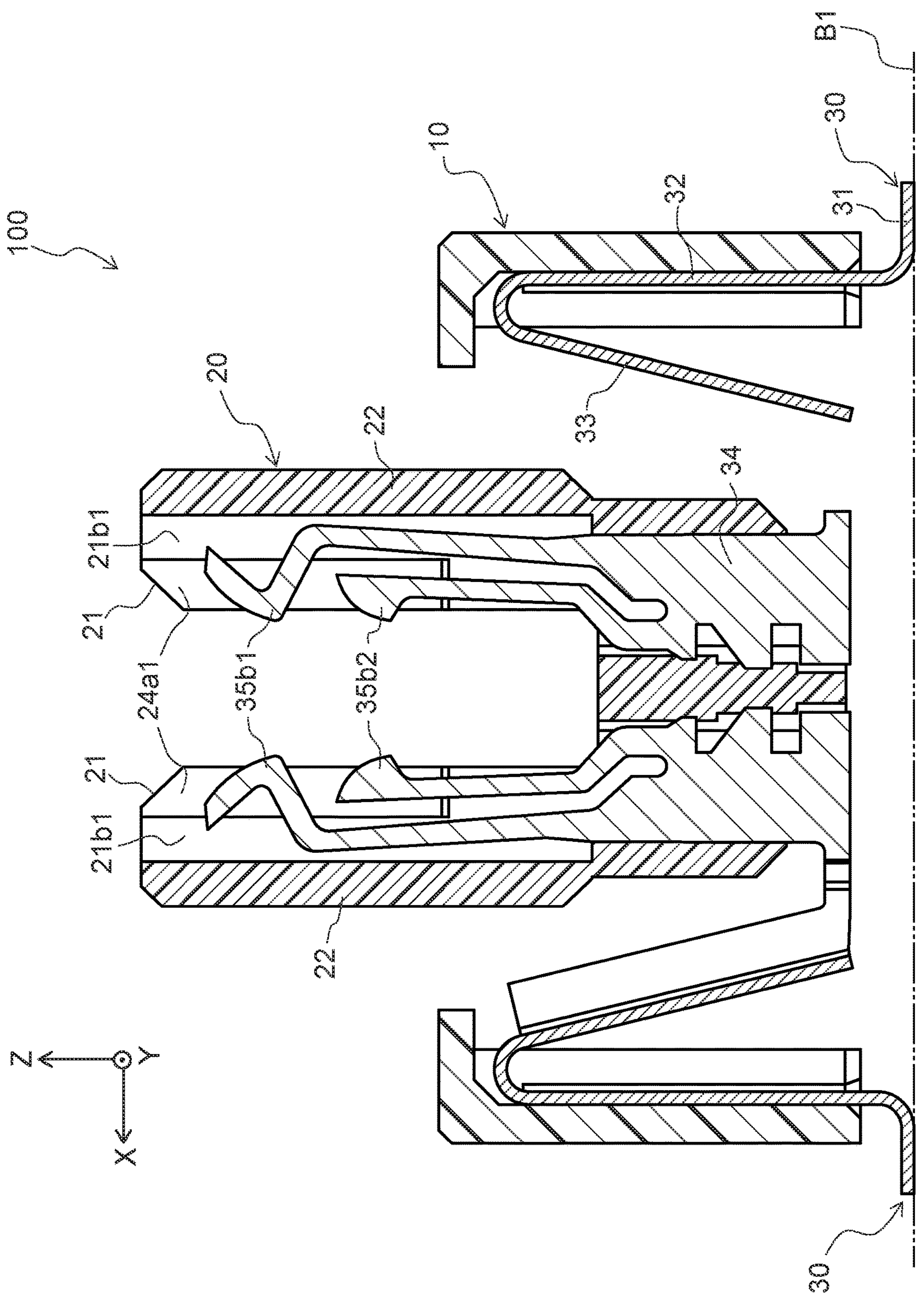
FIG. 1 is a cross-section of a connector.
Figure 2:
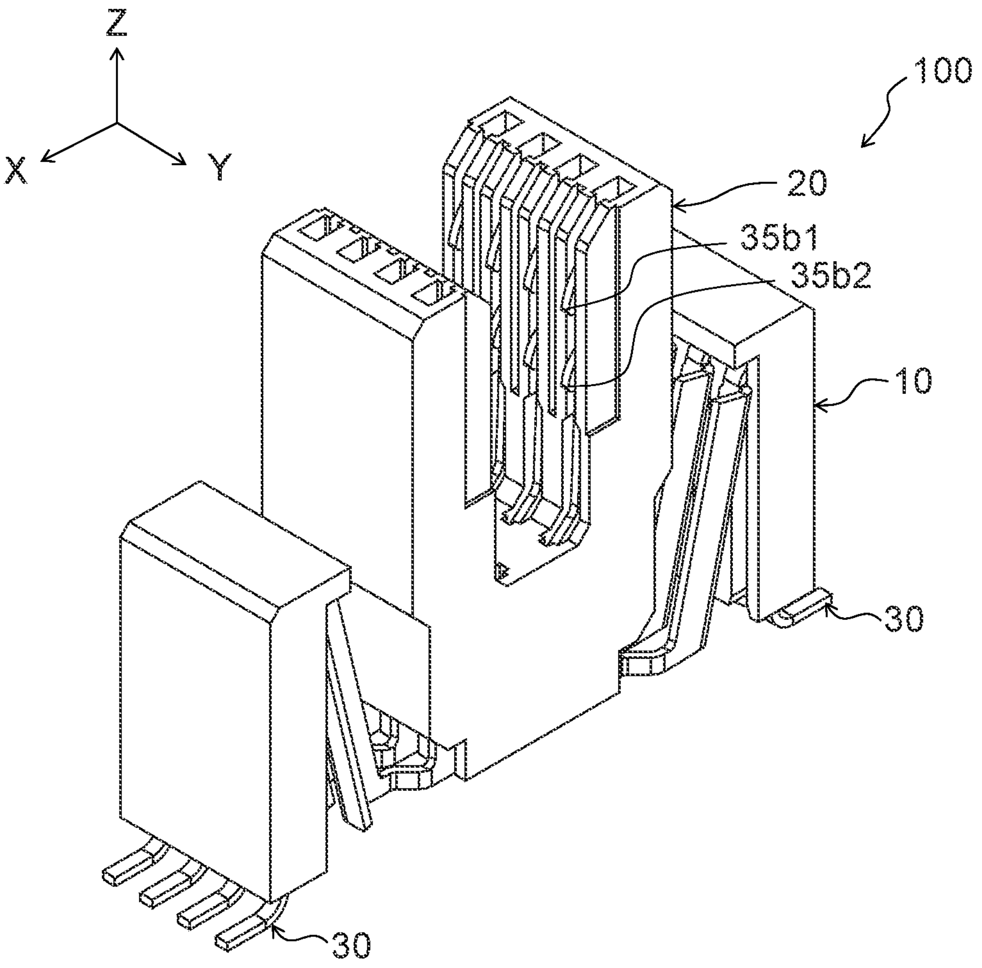
FIG. 2 is a perspective view of a connector.
Figure 3:
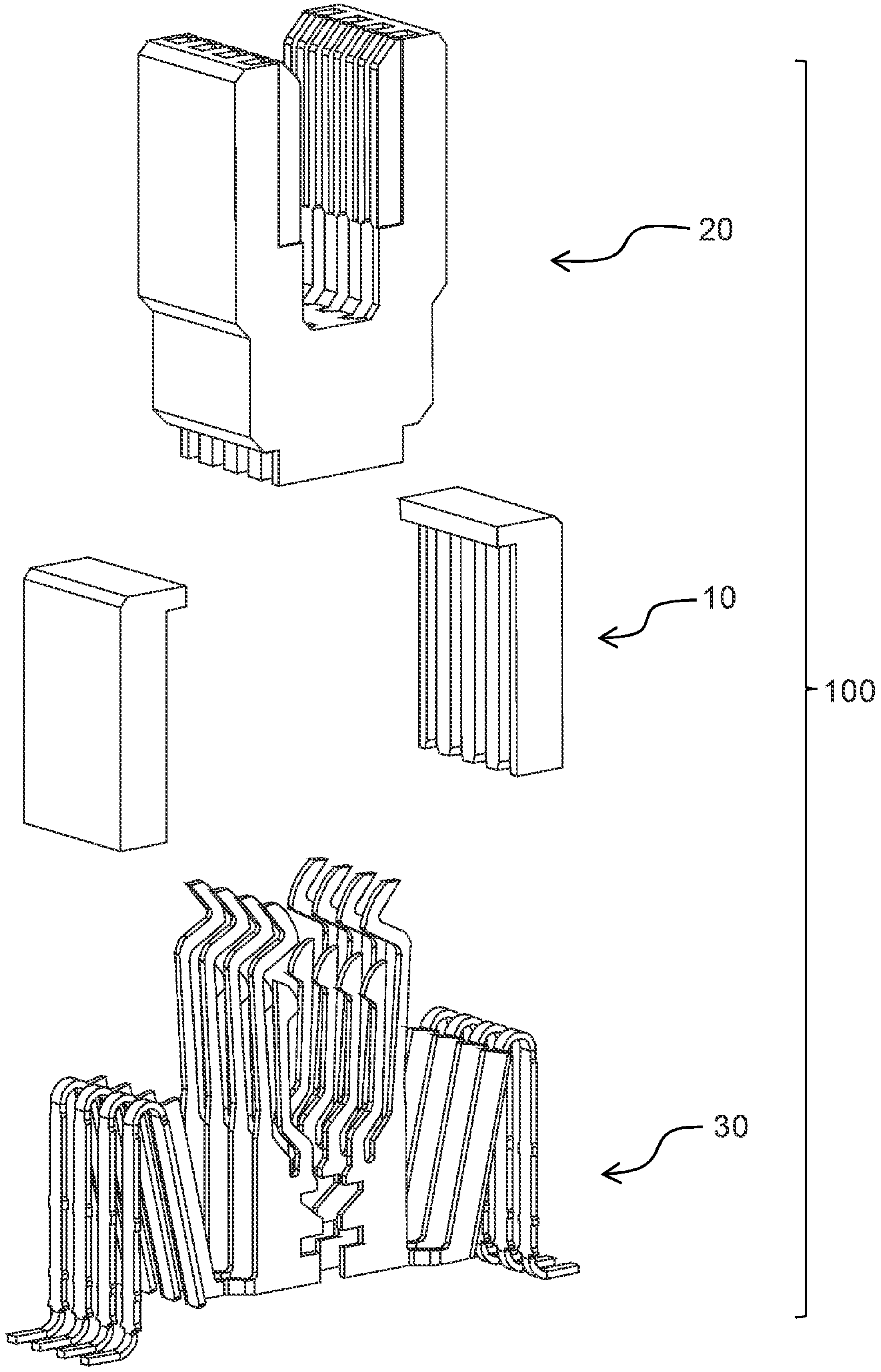
FIG. 3 is an exploded perspective view of a connector.

As illustrated in FIG. 1 to FIG. 3, the connector 100 includes housings 10, 20, and plural terminals 30. The housings 10, 20 include a fixed housing 10 and a movable housing 20.

The fixed housing 10 is a housing fixed to a board B1 that is a mounting target of the connector 100. The fixed housing 10 is fixed to the board B1 through the plural terminals 30.

The movable housing 20 is a housing provided so as to be able to move with respect to the fixed housing 10. The movable housing 20 is supported by the plural terminals 30 in a floating state.

The fixed housing 10 and the movable housing 20 are formed from an insulator such as a synthetic resin or the like.

The terminals 30 are connected to the board B1 and to counterpart terminals (omitted in the drawings) of a counterpart connector (omitted in the drawings). The terminals 30 are made by performing punch and bending processing and the like to a conductive plate material. Each of the plural terminals 30 has the same shape as each other.

The plural terminals 30 are configured from plural (four in the drawing) front-side terminals 30 and by plural (four in the drawing) rear-side terminals 30. A front-side terminal 30 and a rear-side terminal 30 together configure a pair of terminals 30 (see FIG. 4), and these pairs of terminals 30 can be thought of as being arrayed with the Y direction as their array direction. The terminals 30 in a pair are arranged opposing each other such that their contact portion-side directions (direction of the positions of contact portions **35*b*1, 35*b*2 with respect to a connection portion 31** when viewed along the Z direction) face toward the X direction inside.

Next, detailed description follows regarding the terminals 30.

Figure 4:
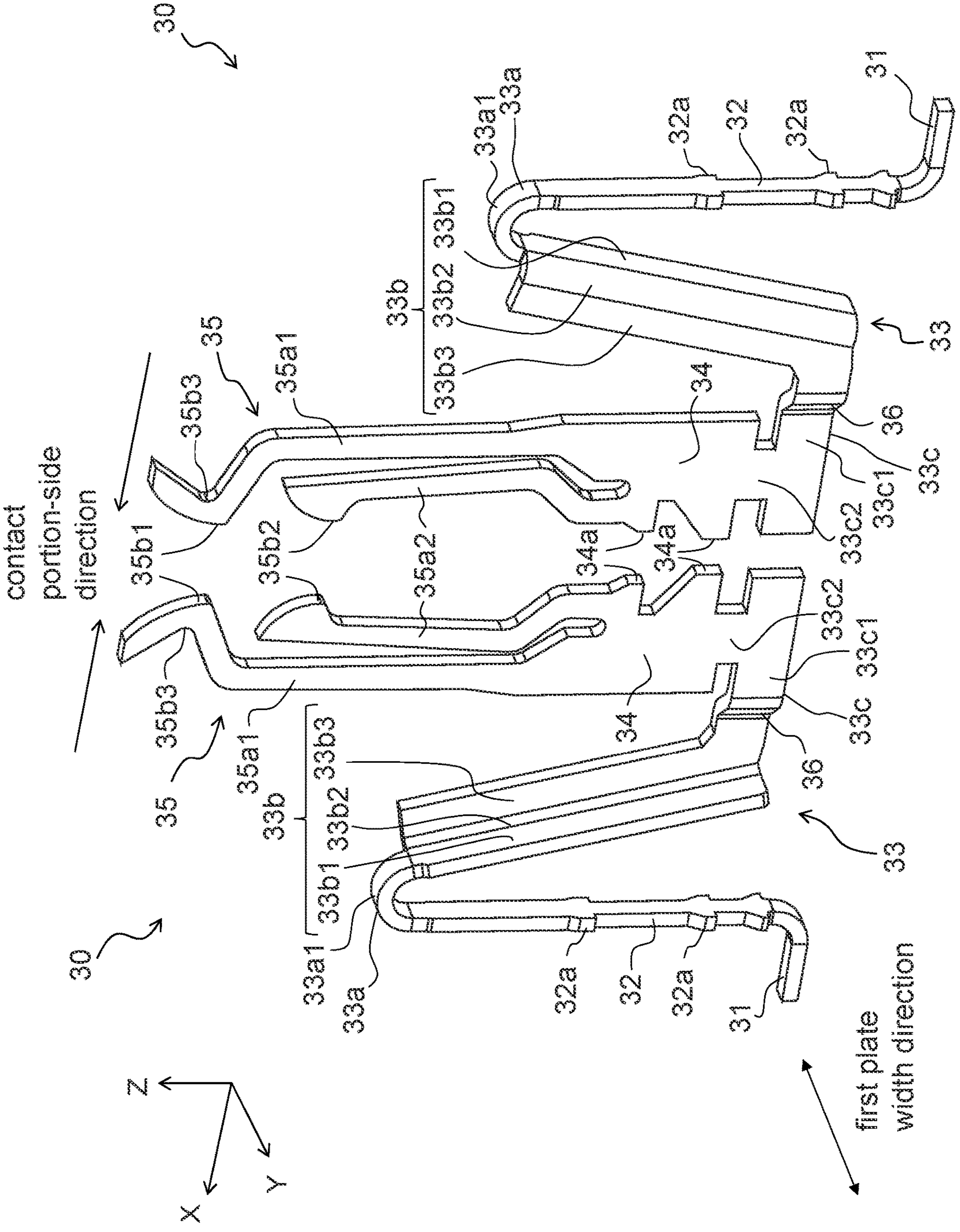
FIG. 4 is a perspective view of a front-rear pair of terminals.

As illustrated in FIG. 4, the terminals 30 each include the connection portion 31, a fixed-side retained portion 32, an intermediate portion 33, a movable-side retained portion 34, and a leading end portion 35, in that order.

The connection portion 31 is a portion connected to the board B1 that is the mounting target.

The connection portion 31 extends from the fixed-side retained portion 32 toward the X direction outside, this being a direction along a plane of the board B1. The connection portion 31 is soldered to a face of the board B1.

The fixed-side retained portion 32 is a portion retained in the fixed housing 10.

The fixed-side retained portion 32 is retained in the fixed housing 10 by being press-fitted into the fixed housing 10 with a +Z direction as the press-fit direction. The fixed-side retained portion 32 has a plate width direction (the plate width direction of the fixed-side retained portion 32 is sometimes referred to as a "first plate width direction") facing in the Y direction that is the terminal array direction, and extends in the +Z direction. The fixed-side retained portion 32 includes press-fit protrusions **32*a*. The press-fit protrusions 32*a* are formed at both plate width direction sides of the fixed-side retained portion 32**.

The intermediate portion 33 is a portion that couples the fixed-side retained portion 32 and the movable-side retained portion 34 together, and is a portion formed deformable so as to enable the movable-side retained portion 34 to displace with respect to the fixed-side retained portion 32.

The intermediate portion 33 includes a first coupling portion **33*a*, a plate thickness direction switching portion 33*b*, and a second coupling portion 33*c***, in this order.

The first coupling portion **33*a* couples the fixed-side retained portion 32 and the plate thickness direction switching portion 33*b* together. The first coupling portion 33*a* extends from the fixed-side retained portion 32 to a first plate face portion 33*b*1 of the plate thickness direction switching portion 33*b***, and has a plate thickness direction facing in a direction parallel to a ZX plane (a plane perpendicular to the first plate width direction).

The first coupling portion **33*a* includes a first bent portion 33*a*1**.

The first bent portion **33*a*1 couples the fixed-side retained portion 32 and the first plate face portion 33*b*1 of the plate thickness direction switching portion 33*b* together. The first bent portion 33*a*1 is a portion bent in the plate thickness direction, and switches a Z direction component of the extension direction of the terminals 30** from plus to minus.

The plate thickness direction switching portion **33*b* switches the plate thickness direction of the terminal 30** from the ZX plane direction to the Y direction (a direction orthogonal to the ZX plane).

The plate thickness direction switching portion **33*b* includes a switching-bend portion 33*b*2, the first plate face portion 33*b*1, and a second plate face portion 33*b*3**.

The switching-bend portion **33*b*2 is a portion bent in the plate thickness direction, and couples the first plate face portion 33*b*1 and the second plate face portion 33*b*3** together.

The first plate face portion **33*b*1 is formed at a fixed-side retained portion 32 side with respect to the switching-bend portion 33*b*2. The first plate face portion 33*b*1** has a flat plate shape, with a plate thickness direction facing in the ZX plane direction.

The first plate face portion **33*b*1 can be thought of as being a portion connected to the first coupling portion 33*a* and extending toward the other end side (contact portion 35*b*1, 35*b*2 side) of the terminal 30. When thought of in this manner, the first plate face portion 33*b*1 is a portion having an extension direction having a straight line shape. The extension direction of the first plate face portion 33*b*1 is a direction inclined toward the −Z direction and the X direction inside. The plate width direction of the first plate face portion 33*b*1** faces along the Y direction that is the first plate width direction.

The second plate face portion **33*b*3 is formed on the movable-side retained portion 34 side with respect to the switching-bend portion 33*b*2. The second plate face portion 33*b*3** has a flat plate shape with a plate thickness direction facing in the Y direction (a direction orthogonal to the ZX plane).

The second plate face portion **33*b*3 is parallel to the first plate face portion 33*b*1, and can be thought of as being a portion extending toward the other end side (contact portion 35*b*1, 35*b*2 side) of the terminal 30. When thought of in this manner, the second plate face portion 33*b*3 is a portion having a straight line shaped extension direction. The extension direction of the second plate face portion 33*b*3** is a direction inclined toward the −Z direction and the X direction inside.

The second coupling portion **33*c* is a portion that couples the plate thickness direction switching portion 33*b* and the movable-side retained portion 34** together.

The second coupling portion **33*c* includes an X direction extension portion 33*c*1 and a Z direction extension portion 33*c*2**.

The X direction extension portion **33*c*1 extends toward the X direction inside from the other end of the second plate face portion 33*b*3 of the plate thickness direction switching portion 33*b***.

A displacement portion 36 is formed to the X direction extension portion **33*c*1**.

The displacement portion 36 is configured by two bent portions bent in opposite directions to each other at the same angle (preferably an angle less than 90° as illustrated in the drawings). These two bent portions are bent in the plate thickness direction so as to change the plate thickness direction of the second coupling portion **33*c* within an XY plane. The plate thickness direction of a portion further to the other end side of the second coupling portion 33*c* (the movable-side retained portion 34 side thereof) than the displacement portion 36 thereby faces in the Y direction, and a Y direction position of a portion of the second coupling portion 33*c* further to the other end side than the displacement portion 36 is thereby aligned with a Y direction position of the fixed-side retained portion 32. Namely, a Y direction position of the terminal 30 that is displaced at the plate thickness direction switching portion 33*b* is corrected by the displacement portion 36**.

The Z direction extension portion **33*c*2 extends in the +Z direction from the X direction extension portion 33*c*1**.

The width dimension (X direction dimension) of the Z direction extension portion **33*c*2 is smaller than the movable-side retained portion 34 width direction dimension. The Z direction extension portion 33*c*2 is coupled to a width direction central position of the movable-side retained portion 34. A portion of the X direction extension portion 33*c*1 from which the Z direction extension portion 33*c*2 extends functions as a portion held in place by a tool when the movable-side retained portion 34 is being press-fitted into the movable housing 20**.

The intermediate portion 33 can be divided into portions surrounded by the housings 10, 20, and a portion not surrounded by the housings 10, 20 (an exposed portion). More specifically, the intermediate portion 33 includes a portion surrounded by the fixed housing 10, a portion not surrounded by the housings 10, 20, and a portion surrounded by the movable housing 20, in that order. The portion surrounded by the fixed housing 10 is part of the first bent portion **33*a*1 of the first coupling portion 33*a*. The portion surrounded by the movable housing 20 is part of the X direction extension portion 33*c*1 and the Z direction extension portion 33*c*2 of the second coupling portion 33*c*. The plate thickness direction switching portion 33*b* is formed at the portion not surrounded by the housings 10, 20**.

The movable-side retained portion 34 is a portion retained in the movable housing 20. The movable-side retained portion 34 is retained in the movable housing 20 by being press-fitted into the movable housing 20 with the +Z direction as the press-fit direction. The movable-side retained portion 34 has a plate thickness direction facing in the Y direction, a plate width direction facing in the X direction, and extends in the +Z direction. The movable-side retained portion 34 includes press-fit protrusions **34*a*. The press-fit protrusions 34*a* are formed only on the X direction inside from out of the plate width directions of the movable-side retained portion 34. The press-fit protrusions 34*a* are formed at plural different locations (two locations in the drawings) in the extension direction of the movable-side retained portion 34. The press-fit protrusions 34*a* formed at the plural locations all bite into the movable housing 20**.

The leading end portion 35 is a portion further toward the other end side than the movable-side retained portion 34.

The leading end portion 35 includes the contact portions **35*b*1, 35*b*2 and resilient support portions 35*a*1, 35*a*2**.

The contact portions **35*b*1, 35*b*2 are portions that contact the counterpart terminals (omitted in the drawings) of the counterpart connector (omitted in the drawings). The counterpart connector is connected with the −Z direction as the connection direction, and is disposed at the X direction inside with respect to the contact portions 35*b*1, 35*b*2. Namely, the X direction inside direction of the contact portions 35*b*1, 35*b*2** makes contact with the counterpart connector.

The contact portions **35*b*1, 35*b*2 include a first contact portion 35*b*1 (first contact portion) and a second contact portion 35*b*2** (second contact portion).

The first contact portion **35*b*1 is a contact portion at a position at the near side in the −Z direction, this being the connection direction of the connection target, and the second contact portion 35*b*2 is a contact portion at a position at the far side in the −Z direction, this being the connection direction of the connection target. The first contact portion 35*b*1 includes a function to wipe a portion of the connection target that will contact the second contact portion 35*b*2**.

An indentation **35*b*3 indented toward the X direction inside is formed at the X direction outside of the first contact portion 35*b*1. A cross-sectional area of the first contact portion 35*b*1** (surface area of cross-section perpendicular to the Z direction) is suppressed from becoming excessively large and impedance is adjusted thereby.

The resilient support portions **35*a*1, 35*a*2 are portions that resiliently support the contact portions 35*b*1, 35*b*2**.

The resilient support portions **35*a*1, 35*a*2 include a first resilient support portion 35*a*1 and a second resilient support portion 35*a*2. The first resilient support portion 35*a*1 supports the first contact portion 35*b*1, and the second resilient support portion 35*a*2 supports the second contact portion 35*b*2. When the counterpart connector (omitted in the drawings) is connected to the connector 100, the resilient support portions 35*a*1, 35*a*2 resiliently deform such that the contact portions 35*b*1, 35*b*2** are displaced toward the X direction outside.

The first resilient support portion **35*a*1 extends from a base thereof substantially parallel to the +Z direction and is connected to the first contact portion 35*b*1. The second resilient support portion 35*a*2 extends from a base thereof in a direction inclined toward the +Z direction and X direction outside, and thereafter extends in a direction inclined toward the +Z direction and the X direction inside and is connected to the second contact portion 35*b*2. The second resilient support portion 35*a*2 and the second contact portion 35*b*2 are disposed at the X direction inside with respect to the first resilient support portion 35*a*1**.

Fixed Housing 10

Next, detailed description follows regarding the fixed housing 10.

Figure 5:
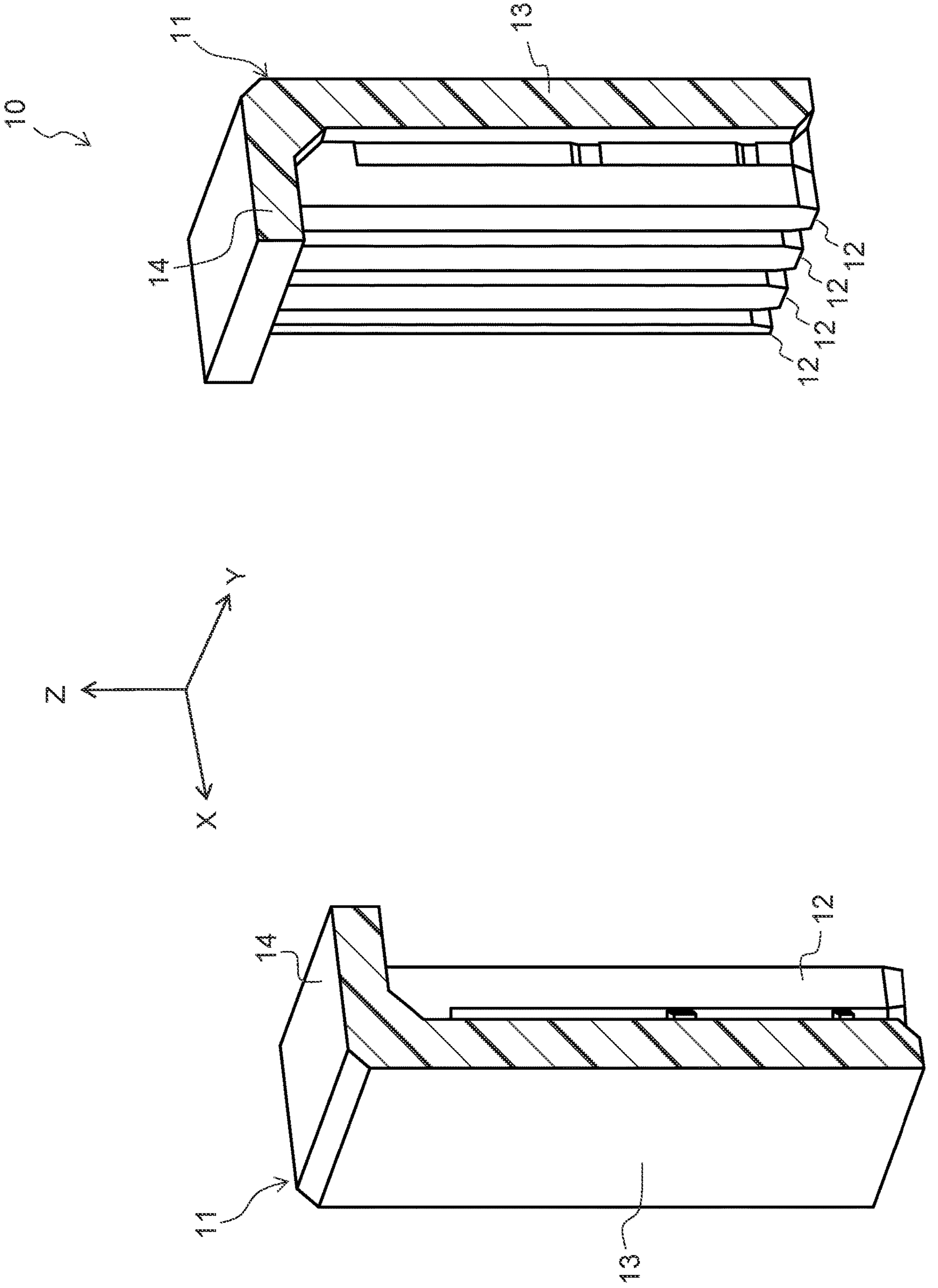
FIG. 5 is a cross-section perspective view of a fixed housing.

As illustrated in FIG. 5, the fixed housing 10 includes a front side terminal retaining portion 11 and a rear side terminal retaining portion 11. The front side terminal retaining portion 11 and the rear side terminal retaining portion 11 have the same structure as each other. These are both referred to simply as terminal retaining portions 11 when not discriminating therebetween.

The terminal retaining portions 11 each include plural array direction walls 12.

The array direction walls 12 are disposed with respect to the fixed-side retained portion 32 of the terminal 30 at positions on both sides thereof in the Y direction, which is the array direction and plate width direction. The fixed-side retained portions 32 are each press-fitted into a space between adjacent array direction walls 12 from out of the plural array direction walls 12. These spaces are open toward the X direction inside. These open portions thereby enable the intermediate portion 33 (more specifically the first bent portion **33*a*1) of each of the terminals 30 to pass through when the fixed-side retained portion 32** is being press-fitted.

The terminal retaining portions 11 each include an outside wall 13.

The outside wall 13 is disposed at a position on the X direction outside with respect to the fixed-side retained portions 32. The outside wall 13 is connected to the X direction outside ends of the plural array direction walls 12.

The terminal retaining portions 11 each include a top wall 14.

The top wall 14 is positioned further in the +Z direction than the fixed-side retained portion 32 and part of the intermediate portion 33. The top wall 14 is connected to the +Z direction side of the plural array direction walls 12. The top wall 14 extends from a +Z direction end of the outside wall 13 toward the X direction inside.

Movable Housing 20

Next detailed explanation follows regarding the movable housing 20.

Figure 6:
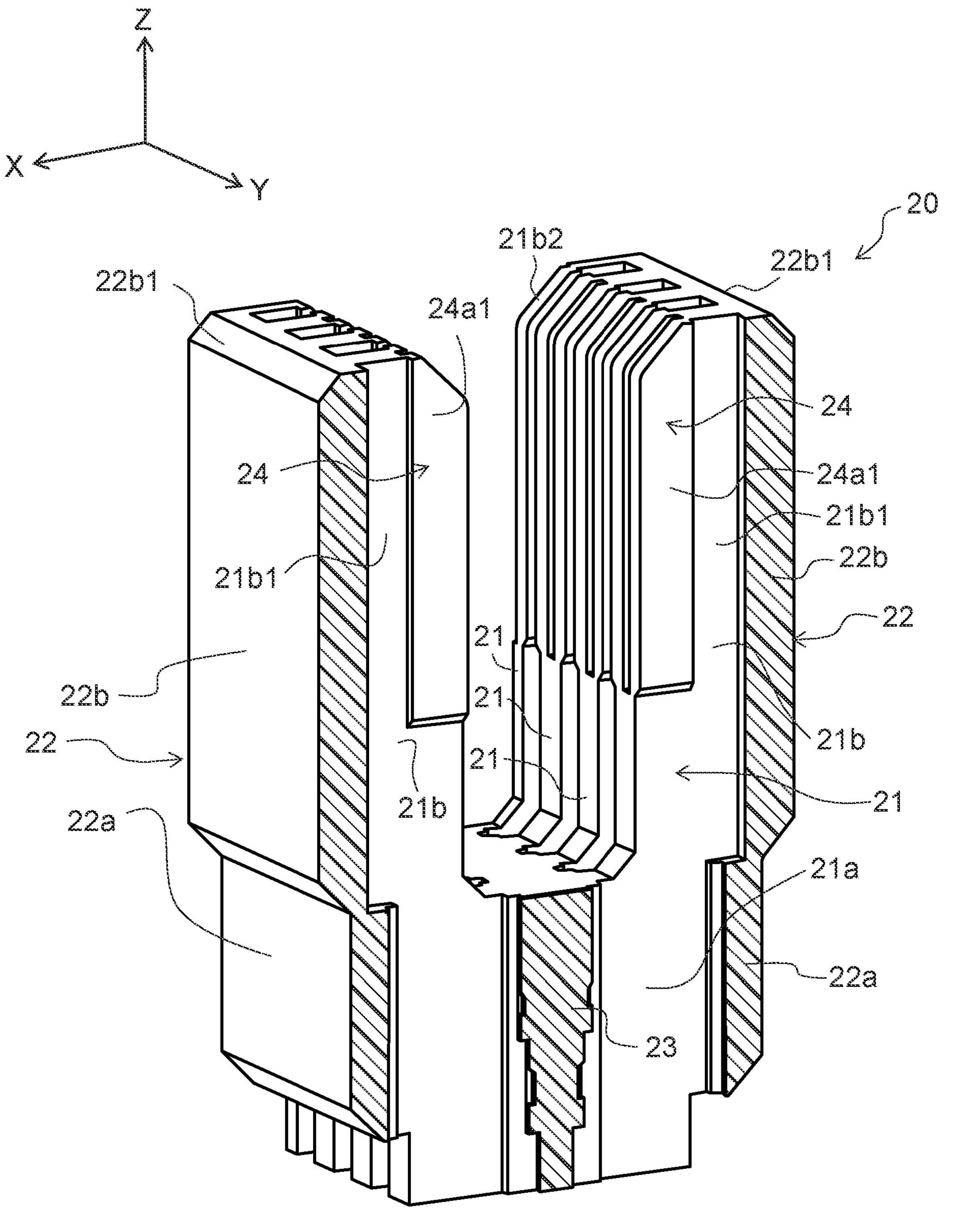
FIG. 6 is a cross-section perspective view of a movable housing.

As illustrated in FIG. 6, the movable housing 20 includes plural array direction walls 21.

The array direction walls 21 are disposed at positions with respect to parts of the terminals 30 on both sides thereof in the Y direction, which is the array direction. The array direction walls 21 positioned between adjacent terminals 30 from out of the plural array direction walls 21 are sometimes referred to as separation walls 21. The array direction walls 21 include guide faces **21*b*2** to guide the counterpart connector (omitted in the drawings) to an appropriate position in the X direction.

The array direction walls 21 include a lower array direction wall **21*a* and an upper array direction wall 21*b***.

The lower array direction wall **21*a* corresponds to the movable-side retained portion 34 and part of the intermediate portion 33**.

The upper array direction wall **21*b* corresponds to the leading end portion 35. The upper array direction wall 21*b* is separated into a front side portion and a rear side portion. A space for inserting part of the counterpart connector (omitted in the drawings) into is formed between the upper array direction wall 21*b* on the front side and the upper array direction wall 21*b*** on the rear side.

The lower array direction wall **21*a*** is integrally formed with a front side portion and a rear side portion.

The movable housing 20 includes a front-rear pair of outside walls 22.

The outside walls 22 are positioned at the X direction outside with respect to part of the terminals 30. The outside walls 22 couple the plural array direction walls 21 together at X direction outside portions thereof. The outside walls 22 each include a guide face **22*b*1** to guide the counterpart connector (omitted in the drawings) to an appropriate position in the X direction.

The outside walls 22 each include a lower outside wall **22*a* and an upper outside wall 22*b***.

The lower outside wall **22*a* corresponds to the movable-side retained portion 34**.

The upper outside wall **22*b* corresponds to the leading end portion 35. The upper outside wall 22*b* is formed further to the X direction outside than the lower outside wall 22*a*, and a space inside the movable housing 20** is widened at an upper portion thereof.

The movable housing 20 includes an array direction coupling wall 23.

The array direction coupling wall 23 couples the plural lower array direction walls **21*a*** together in the array direction.

Spaces between the array direction coupling wall 23 and the lower outside wall **22*a* are spaces through which the leading end portions 35 of the terminals 30 pass when assembling the terminals 30 to the movable housing 20 and in which the movable-side retained portions 34 are disposed. The movable-side retained portions 34 are press-fitted between the array direction coupling wall 23 and the lower outside wall 22*a***.

Figure 7:
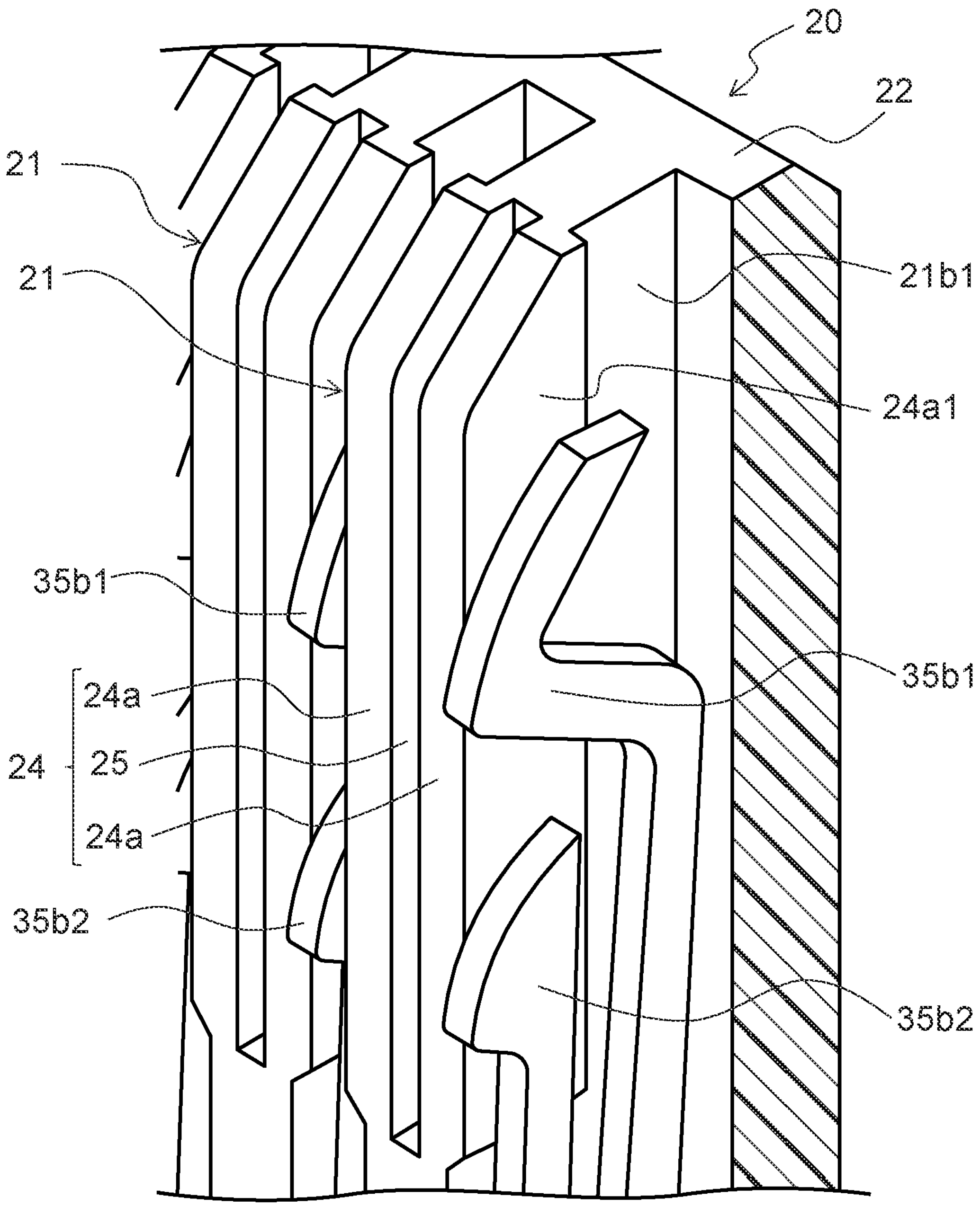
FIG. 7 is a cross-section perspective view illustrating an enlargement of a vicinity of a gap portion.

As illustrated in FIG. 7, enlarged width portions 24 are formed to the array direction walls 21.

The enlarged width portions 24 are portions where the wall thickness of the array direction walls 21 is enlarged. The enlarged width portions 24 are formed at positions corresponding to the contact portions **35*b*1, 35*b*2 of the terminals 30 when in a connected state to the counterpart connector (see FIG. 1, FIG. 1 illustrates the terminals 30 in a state connected to the counterpart connector). A wall face 24*a*1 of each of the enlarged width portions 24 is disposed in closer proximity to the terminals 30 than a wall face 21*b*1 of other portions general portions) of the array direction walls 21. The Y direction dimension of the space in which the contact portions 35*b*1, 35*b*2 are disposed thereby becomes smaller, suppressing the contact portions 35*b*1, 35*b*2 from being positioned significantly displaced in the Y direction from specific positions thereof. In the following the contact portions 35*b*1, 35*b*2 are sometimes referred to as restricted portions 35*b*1, 35*b*2. The wall faces 24*a*1 of the enlarged width portions 24 are sometimes referred to as restricting faces 24*a*1, and the wall faces 21*b*1 of the general portions are sometimes referred to as separated faces 21*b*1. The restricting faces 24*a*1 and the separated faces 21*b*1 are both flat faces having a normal direction facing in the Y direction. The restricting faces 24*a*1 are each formed at a region on the +Z direction and X direction inside of a wall face of the upper array direction wall 21*b*. This means that the separated face 21*b*1 is formed at a position displaced from the position of the wall face 24*a*1 toward the X direction outside, a position displaced from the position of the wall face 24*a*1 toward the −Z direction, and at a position displaced from the position of the wall face 24*a*1** toward the X direction outside and the −Z direction.

Gap portions 25 are formed in the separation walls 21.

The gap portions 25 are portions where a gap is formed at a wall thickness direction intermediate portion of the separation walls 21, and are grooves open toward the +Z direction and the X direction inside. The gap portions 25 are formed in the array direction walls 21 at positions corresponding to the enlarged width portions 24. The enlarged width portions 24 are accordingly each configured from a pair of the separation walls **24*a* and the gap portion 25 therebetween. The gap portion 25 is accordingly formed between a pair of the wall faces 24*a*1 provided to the array direction wall 21, at a position between adjacent of the contact portions 35*b*1, 35*b*2**.

Operation and Advantageous Effects

Next, description follows regarding the operation and advantageous effects of the present exemplary embodiment.

As illustrated in FIG. 1 to FIG. 3, in the present exemplary embodiment the connector 100 includes the plural terminals 30, and the housings 10, 20.

As illustrated in FIG. 7, the housings 10, 20 include the separation walls 21 positioned between adjacent of the terminals 30. The separation walls 21 each include one-side opposing faces **21*b*1, 24*a*1, and other-side opposing faces 21*b*1, 24*a*1. The one-side opposing faces 21*b*1, 24*a*1 are faces opposing one of adjacent terminals 30, and the other-side opposing faces 21*b*1, 24*a*1 are faces opposing the other adjacent terminal 30**.

Furthermore, the separation walls 21 are formed between the one-side opposing faces **21*b*1, 24*a*1 and the other-side opposing faces 21*b*1, 24*a*1, and include the gap portions 25 positioned between the adjacent terminals 30**.

This thereby raises the impedance of close proximity portions of the terminals 30 corresponding to the gap portion 25 in comparison to embodiments not formed with such gap portions 25. As a result thereof, the impedance of the terminals 30 can be suppressed from falling excessively.

Moreover, in the present exemplary embodiment the terminals 30 include the restricted portions **35*b*1, 35*b*2. The one-side opposing faces 21*b*1, 24*a*1 include the one-side restricting face 24*a*1 that restricts movement of one of adjacent restricted portions 35*b*1, 35*b*2 in a direction approaching the other thereof, and the other-side opposing faces 21*b*1, 24*a*1 include the other-side restricting face 24*a*1 that restricts movement of the other adjacent restricted portion 35*b*1, 35*b*2** in a direction approaching the one thereof.

Part of the terminals 30 (the restricted portions **35*b*1, 35*b*2**) are thereby suppressed from being disposed at positions displaced from specific positions.

Moreover, the restricted portions **35*b*1, 35*b*2 are the contact portions 35*b*1, 35*b*2** configured to contact the connection target (counterpart connector).

This means that the contact portions **35*b*1, 35*b*2** are suppressed from being disposed at positions displaced from the specific positions.

Note that the restricted portions **35*b*1, 35*b*2 are disposed in the vicinity of the separation walls 21, and so are liable to suffer an excessive drop in impedance. The gap portions 25 are accordingly preferably respectively positioned between the adjacent restricted portions 35*b*1, 35*b*2 (the contact portions 35*b*1, 35*b*2**) as in the present exemplary embodiment.

Moreover, in the present exemplary embodiment, the contact portions **35*b*1, 35*b*2 include the first contact portion 35*b*1 and the second contact portion 35*b*2, which is positioned further toward the far side than the first contact portion 35*b*1** in the connection direction of the connection target (counterpart connector).

The gap portions 25 are accordingly positioned between the adjacent first contact portions **35*b*1 and are also positioned between the adjacent second contact portions 35*b*2. This thereby enables the first contact portion 35*b*1 and the second contact portion 35*b*2 to be suppressed from being disposed at positions displaced from the specific positions while also enabling an excessive drop in impedance of the first contact portion 35*b*1 and the second contact portion 35*b*2** to be suppressed.

Moreover, in the present exemplary embodiment, a portion of the gap portion 25 positioned between the adjacent first contact portions **35*b*1 and a portion thereof positioned between the adjacent second contact portions 35*b*2** are coupled together in the connection direction (Z direction).

This accordingly enables the gap portion 25 to be more easily formed than embodiments in which a portion of the gap portion 25 positioned between the adjacent first contact portions **35*b*1 and a portion thereof positioned between the adjacent second contact portions 35*b*2** are not coupled together.

Moreover, in the present exemplary embodiment, each of the plural terminals 30 includes the resilient support portions **35*a*1, 35*a*2 that resiliently support the contact portions 35*b*1, 35*b*2**.

The separation walls 21 are configured so as to be interposed between the adjacent resilient support portions **35*a*1, 35*a*2**.

Shorting between adjacent resilient support portions **35*a*1, 35*a*2 caused by metal-plating gas is thereby prevented at the portions where the separation walls 21 are interposed between the adjacent resilient support portions 35*a*1, 35*a*2**.

Moreover, in the present exemplary embodiment, the separation walls 21 each include either the one-side separated face **21*b*1, or the other-side separated face 21*b*1**, or both thereof (both in the present exemplary embodiment).

The one-side separated face **21*b*1 is a face facing toward the side of one of the adjacent resilient support portions 35*a*1, 35*a*2, and is a face formed at a position further away from the one resilient support portions 35*a*1, 35*a*2 than the one restricting face 24*a*1 in an adjacency direction (the direction of adjacency between the adjacent resilient support portions 35*a*1, 35*a*2, the Y direction). The other-side separated face 21*b*1 is a face facing toward the side of the other adjacent resilient support portions 35*a*1, 35*a*2, and is a face formed at a position further away from the other of the resilient support portions 35*a*1, 35*a*2 than the other restricting face 24*a*1** in the adjacency direction (Y direction).

The impedance of the resilient support portions **35*a*1, 35*a*2 can accordingly be suppressed from dropping excessively in comparison to embodiments in which the separation walls 21 lack both the one-side separated face 21*b*1 and the other-side separated face 21*b*1** (e.g. a second modified example described later).

Moreover, in the present exemplary embodiment the one-side separated face **21*b*1 or the other-side separated face 21*b*1 provided to the separation wall 21 includes a near-side separated face 21*b*1. The near-side separated face 21*b*1 is a face formed at a position respectively displaced from a position of the one-side restricting face 24*a*1 or a position of the other-side restricting face 24*a*1 in the opposite direction (hereafter referred to as "opposite-to-contact direction", which is the X direction outside) to a contact direction (a direction in which the contact portions 35*b*1, 35*b*2** contact the connection target (counterpart connector)).

Thus when part of the resilient support portions 35*a*1, 35*a*2 (upper portions of the first resilient support portion 35*a*1 in the present exemplary embodiment) is disposed at a position displaced from the position of the contact portions 35*b*1, 35*b*2 in the opposite-to-contact direction, the impedance of this part of the resilient support portions 35*a*1, 35*a*2 can be suppressed from dropping excessively.

Moreover, in the present exemplary embodiment, the one-side separated face 21*b*1 or the other-side separated face 21*b*1 respectively provided to each of the separation walls 21 includes a first far-side separated face 21*b*1. The first far-side separated face 21*b*1 is a face formed at a position displaced from the position of the one restricting face 24*a*1 or the other restricting face 24*a*1 toward the far side in the connection direction of the connection target (counterpart connector).

Thus when part of the resilient support portions 35*a*1, 35*a*2 (the second resilient support portion 35*a*2 in the present exemplary embodiment) is disposed at a position displaced from the position of the contact portions 35*b*1, 35*b*2 toward the far side in the connection direction, the impedance of this part of the resilient support portions 35*a*1, 35*a*2 can be suppressed from dropping excessively.

Moreover, in the present exemplary embodiment the one-side separated face 21*b*1 or the other-side separated face 21*b*1 includes a second far-side separated face 21*b*1. The second far-side separated face 21*b*1 is a face formed at a position respectively displaced from the position of the one restricting face 24*a*1 or the other restricting face 24*a*1 toward the far side in the opposite-to-contact direction and the connection direction.

Thus when part of the resilient support portions 35*a*1, 35*a*2 (a lower portion of the first resilient support portion 35*a*1 in the present exemplary embodiment) is disposed at the position displaced from the position of the contact portions 35*b*1, 35*b*2 toward the far side in the opposite-to-contact direction and the connection direction, the impedance of this part of the resilient support portions 35*a*1, 35*a*2 can be suppressed from dropping excessively.

Modified Examples

FIG. 8 to FIG. 11 are diagrams illustrating connectors of a first modified example to a fourth modified example. Points of difference between the above exemplary embodiment and each of the modified examples are merely in a structure of the movable housing.

Figure 8:
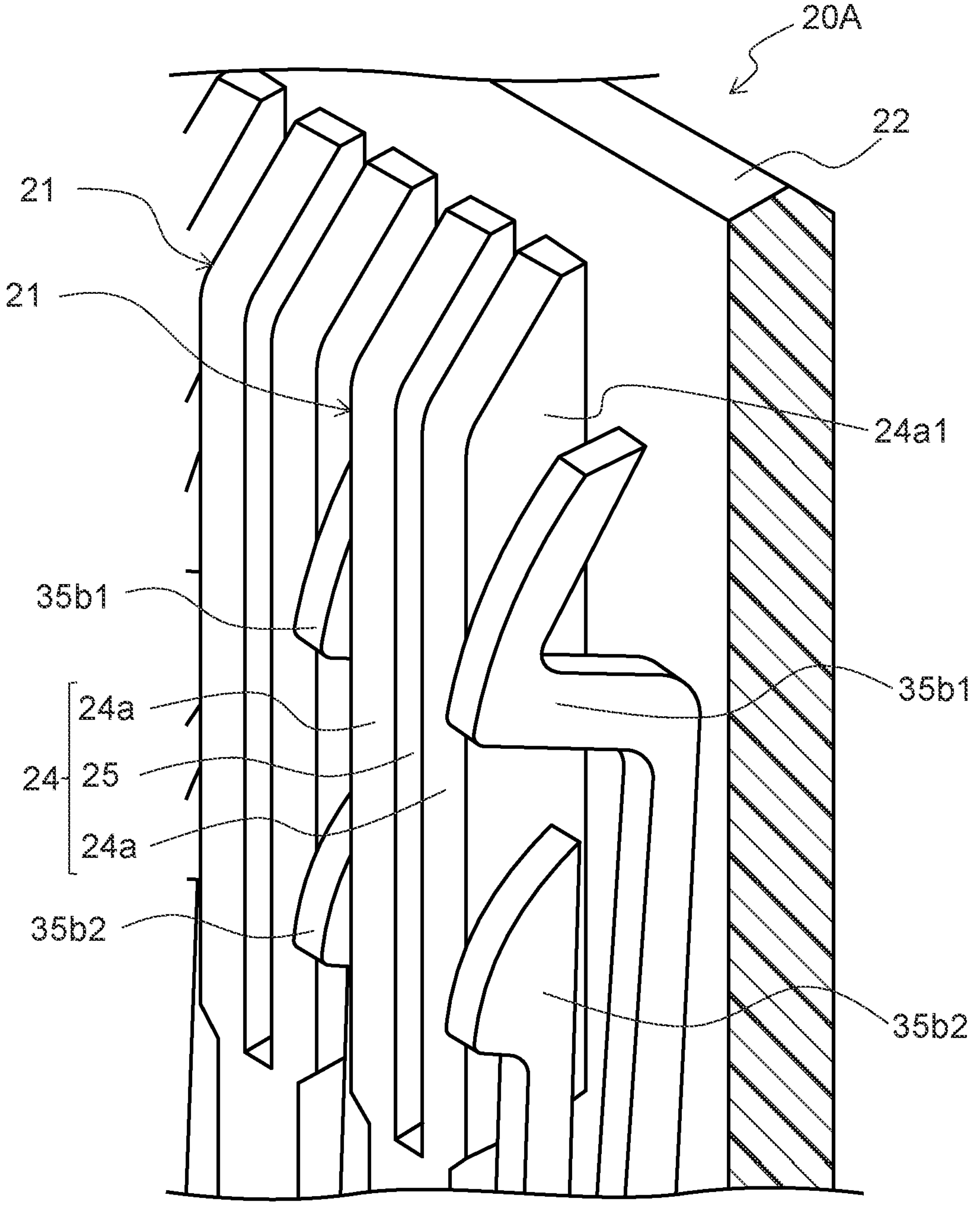
FIG. 8 is a cross-section perspective view illustrating a first modified example.

FIG. 8 illustrates the first modified example.

In a movable housing 20A of the first modified example an upper array direction wall 21*b* is not coupled to an upper outside wall 22*b*. This means that there is a space between the upper array direction wall 21*b* and the upper outside wall 22*b*, and this space extends in the Y direction. Namely, there are no portions that correspond to the near-side separated face 21*b*1 and the second far-side separated face 21*b*1 of the upper array direction wall 21*b* of the above exemplary embodiment. Note that there is a portion present that corresponds to the first far-side separated face 21*b*1.

Thus when part of the resilient support portions 35*a*1, 35*a*2 is disposed at a position displaced from the position of the contact portions 35*b*1, 35*b*2 in the opposite-to-contact direction (X direction outside), the impedance of this part of the resilient support portions 35*a*1, 35*a*2 can be suppressed from dropping excessively even more. Moreover, when part of the resilient support portions 35*a*1, 35*a*2 is disposed at a position displaced from the position of the contact portions 35*b*1, 35*b*2 in the opposite-to-contact direction (X direction outside) and in the connection direction far side (−Z direction), the impedance of this part of the resilient support portions 35*a*1, 35*a*2 can be suppressed from dropping excessively even more. Note that this advantageous effect is an effect exhibited even without the gap portions 25 being formed to the separation walls 21.

Figure 9:
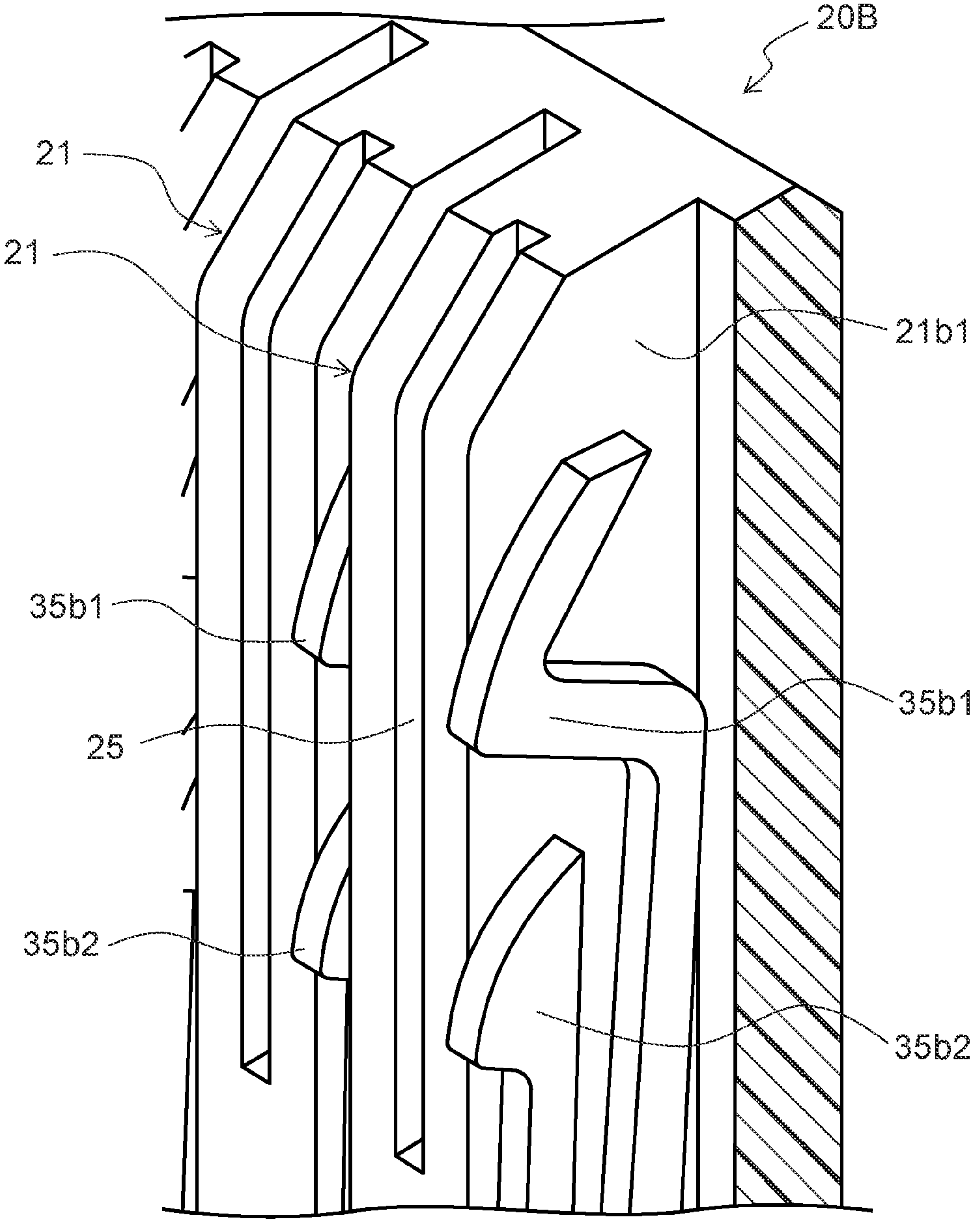
FIG. 9 is a cross-section perspective view illustrating a second modified example.

FIG. 9 illustrates the second modified example.

In a movable housing 20B of the second modified example enlarged width portions (see the enlarged width portions 24 of FIG. 7) are not formed to the array direction walls 21. However, a wall face 21*b*1 of the array direction wall 21 is in close proximity to the terminal 30, and so this can be thought of as the entire array direction wall 21 configuring an enlarged width portion.

In the present modified example the wall face 21*b*1 of the array direction wall 21 corresponds to a "restricting face" and a "opposing face".

Figure 10:
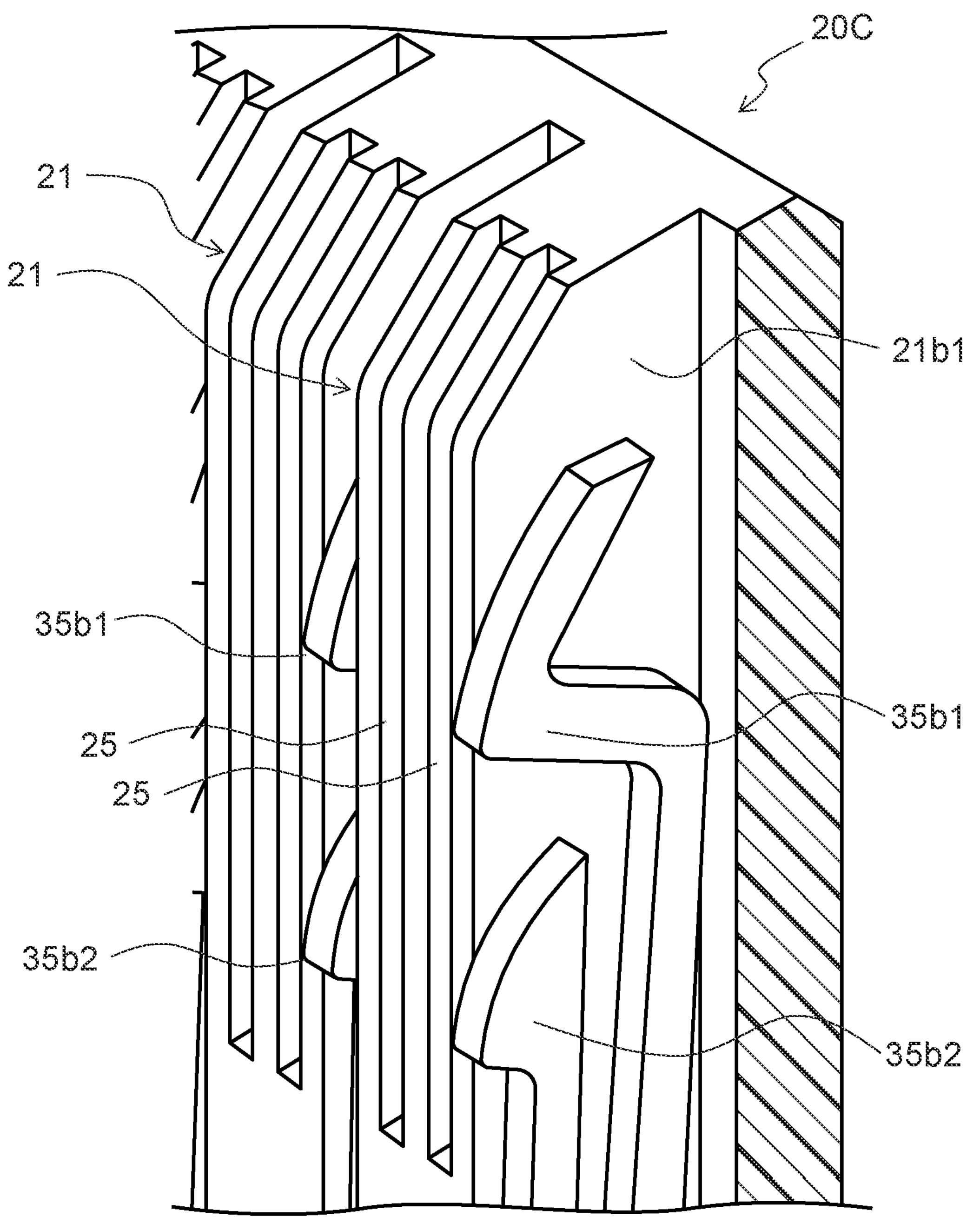
FIG. 10 is a cross-section perspective view illustrating a third modified example.

FIG. 10 illustrates the third modified example.

In a movable housing 20C of the third modified example there are plural (two) gap portions 25 formed to each of the separation walls 21. The impedance of the restricted portions 35*b*1, 35*b*2 can also be suppressed from dropping excessively in cases in which there are plural of the gap portions 25 formed in this manner.

Figure 11:
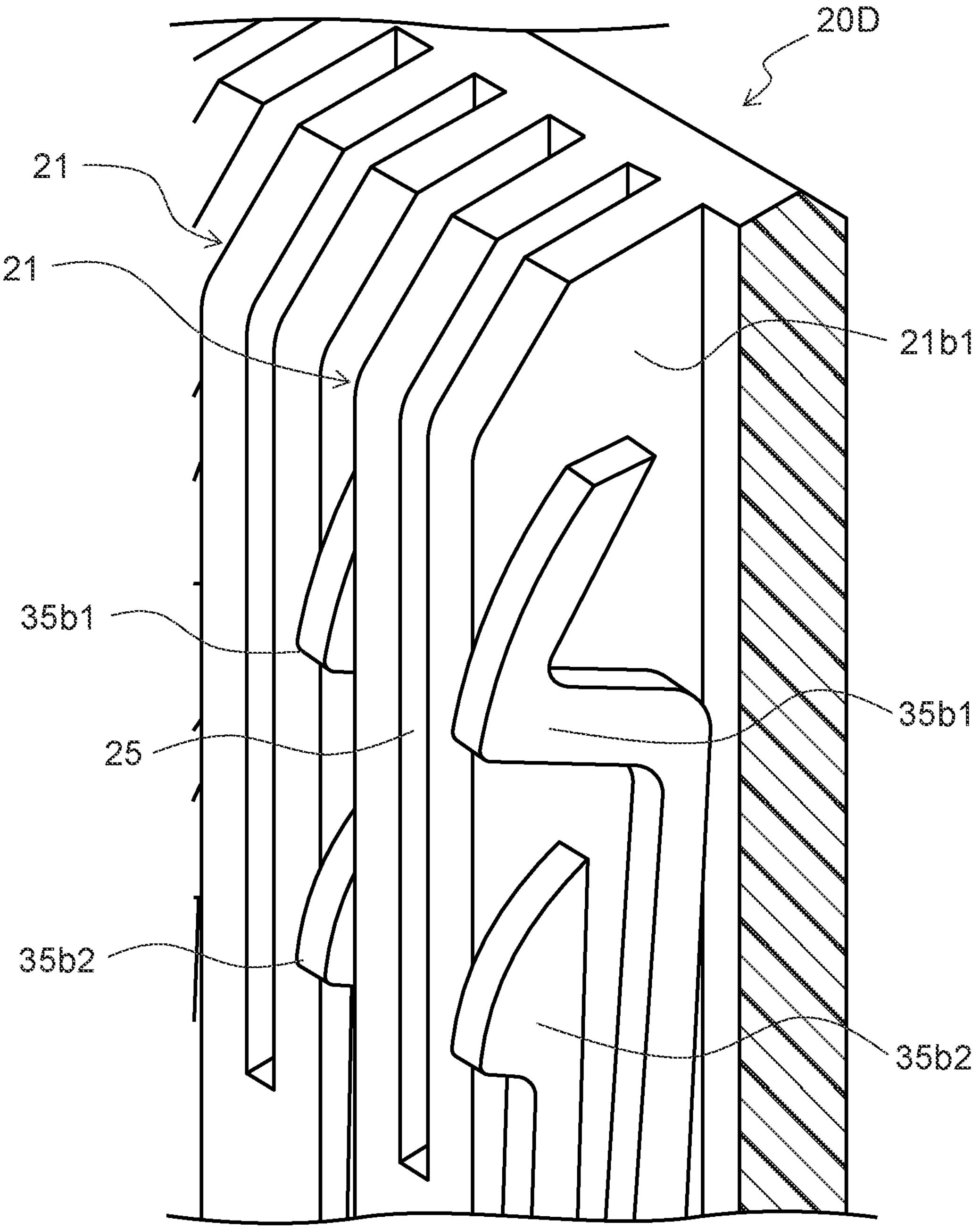
FIG. 11 is a cross-section perspective view illustrating a fourth modified example.

FIG. 11 illustrates the fourth modified example.

In a movable housing 20D of the fourth modified example a depth of each of the gap portions 25 (depth toward the X direction outside) is deeper than in the above exemplary embodiment. More specifically, the depth of the gap portion 25 is the same as a depth of a space formed between adjacent of the separation walls 21 in which the terminals 30 are disposed.

In the present modified example, due to the presence of the gap portions 25, not only can the impedance of the contact portions 35*b*1, 35*b*2 be suppressed from dropping excessively, but the impedance of the resilient support portions 35*a*1, 35*a*2 can also be suppressed from dropping excessively.

Although the present disclosure has been described by way of exemplary embodiments and modified examples, the present disclosure is not limited thereto.

EXPLANATION OF REFERENCE NUMERALS

100 connector
10, 20 housings
10 fixed housing
20 movable housing
20A movable housing
20B movable housing
20C movable housing
20D movable housing
21 array direction wall (separation wall)
21*a* lower array direction wall
21*b* upper array direction wall
21*b*1 separated face (one-side separated face, other-side separated face, near-side separated face, first far-side separated face, second far-side separated face) (one-side opposing face, other-side opposing face)
22 outside wall
22*a* lower outside wall
22*b* upper outside wall
24 enlarged width portion

**24*a*1** restricting face (one-side restricting face, other-side restricting face) (one-side opposing face, other-side opposing face)

25 gap portion

30 terminal

**35*a*1, 35*a*2** resilient support portion

**35*a*1** first resilient support portion

**35*a*2** second resilient support portion

**35*b*1, 35*b*2** contact portion (restricted portion)

**35*b*1** first contact portion (restricted portion)

**35*b*2** second contact portion (restricted portion)

The invention claimed is:

1. A connector comprising a plurality of terminals and a housing, wherein:

the housing includes a separation wall positioned between adjacent of the terminals;

the separation wall includes a one-side opposing face that opposes one of the adjacent terminals, an other-side opposing face that opposes the other of the adjacent terminals, and a gap portion formed between the one-side opposing face and the other-side opposing face;

wherein air or a member having a lower permittivity than the housing is disposed in the gap portion, and no member having a higher permittivity than the housing is disposed in the gap portion.

2. The connector of claim 1, wherein:

the terminals each include a restricted portion;

the one-side opposing face includes a one-side restricting face that restricts one of adjacent of the restricted portions from moving in a direction approaching the other thereof;

the other-side opposing face includes an other-side restricting face that restricts the other adjacent restricted portion from moving in a direction approaching the one thereof; and the restricted portion includes a contact portion configured to contact a connection target.

3. The connector of claim 2, wherein:

the contact portion includes a first contact portion, and a second contact portion positioned further to a far side than the first contact portion in a connection direction of the connection target; and the gap portion is positioned between adjacent of the first contact portions and is positioned between adjacent of the second contact portions.

4. The connector of claim 3, wherein a portion of the gap portion positioned between the adjacent first contact portions and a portion of the gap portion positioned between the adjacent second contact portions are coupled together in the connection direction.

5. The connector of claim 2, wherein:

each of the plurality of terminals includes a resilient support portion that resiliently supports the contact portion; and the separation wall is configured so as to be interposed between adjacent of the resilient support portions.

6. The connector of claim 5, wherein:

the separation wall includes either a one-side separated face that is a face facing a side of one of the adjacent resilient support portions and that is formed at a position separated from the one adjacent resilient support portion further than the one-side restricting face in an adjacency direction of the adjacent resilient support portions, or an other-side separated face that is a face facing toward a side of the other adjacent resilient support portion and that is formed at a position separated from the other adjacent resilient support portion further than the other-side restricting face in the adjacency direction of the adjacent resilient support portions, or both thereof.

7. The connector of claim 6, wherein:

the one-side separated face or the other-side separated face provided to the separation wall includes a near-side separated face formed at a position displaced from a position of the one-side restricting face or the other-side restricting face in an opposite direction to a contact direction in which the contact portion contacts the connection target.

8. The connector of claim 6, wherein:

the one-side separated face or the other-side separated face provided to the separation wall includes a first far-side separated face formed at a position displaced from a position of the one-side restricting face or the other-side restricting face toward a far side in a connection direction of the connection target.

9. The connector of claim 6, wherein:

the one-side separated face or the other-side separated face provided to the separation wall includes a second far-side separated face formed at a position that is displaced from a position of the one-side restricting face or the other-side restricting face in an opposite direction to a contact direction in which the contact portion contacts the connection target and toward a far side in the connection direction of the connection target.

10. The connector of claim 2, wherein:

the contact portion includes a first contact portion, and a second contact portion positioned further to a far side than the first contact portion in a connection direction of the connection target;

each of the plurality of terminals includes a resilient support portion that resiliently supports the contact portion;

the separation wall is configured so as to be interposed between adjacent of the resilient support portions;

the separation wall includes either a one-side separated face that is a face facing a side of one of adjacent of the resilient support portions and that is formed at a position separated from the one adjacent resilient support portion further than the one-side restricting face in an adjacency direction of the adjacent resilient support portions, or an other-side separated face that is a face facing toward a side of the other adjacent resilient support portion and that is formed at a position separated from the other adjacent resilient support portion further than the other-side restricting face in the adjacency direction of the adjacent resilient support portions, or both thereof; and the one-side separated face or the other-side separated face provided to the separation wall includes a near-side separated face formed at a position displaced from a position of the one-side restricting face or the other-side restricting face in an opposite direction to a contact direction in which the contact portion contacts the connection target, a first far-side separated face formed at a position displaced from a position of the one-side restricting face or the other-side restricting face toward a far side in a connection direction of the connection target, and a second far-side separated face formed at a position that is displaced from a position of the one-side restricting face or the other-side restricting face in an opposite direction to the contact direction in which the contact portion contacts the connection target and toward a far side in the connection direction of the connection target.

11. The connector of claim 1, wherein:

the terminals each include a first contact element and a second contact element;

the first contact element includes a first contact portion and a first resilient support portion that resiliently supports the first contact portion; and the second contact element includes a second contact portion positioned further to a far side than the first contact portion in a connection direction of a connection target and a second resilient support portion that resiliently supports the second contact portion.

* * * * *